United States Patent [19]

Bidon et al.

[11] Patent Number: 4,848,481
[45] Date of Patent: Jul. 18, 1989

[54] TRACTOR WITH HYDRAULIC CONTROL SYSTEM FOR PREVENTING SKIDDING

[75] Inventors: Jacques Bidon, Velye; Francois Degraeve, Pont Sainte-Maxence, both of France

[73] Assignee: Jacques Bidon, Vertus, France

[21] Appl. No.: 926,413

[22] PCT Filed: Feb. 21, 1986

[86] PCT No.: PCT/FR86/00055

§ 371 Date: Dec. 11, 1986

§ 102(e) Date: Dec. 11, 1985

[87] PCT Pub. No.: WO86/04770

PCT Pub. Date: Aug. 28, 1986

[30] Foreign Application Priority Data

Feb. 21, 1985 [FR] France ............................ 85 02504

[51] Int. Cl.$^4$ ............................................. A01B 63/11
[52] U.S. Cl. ....................................... 172/7; 180/197; 280/408; 280/446.1
[58] Field of Search ............................ 172/2, 7, 9, 10; 180/6.48, 197; 280/405 R, 405 B, 408, 446 R, 446 A

[56] References Cited

U.S. PATENT DOCUMENTS

| | | | |
|---|---|---|---|
| 2,927,649 | 3/1960 | Poyner et al. | 7/2 |
| 3,690,395 | 9/1972 | Spiller et al. | 180/6.48 |
| 4,132,273 | 1/1979 | Mortonson et al. | 172/7 X |
| 4,186,811 | 2/1980 | Bidon | 180/6.48 |
| 4,537,260 | 8/1985 | Knepper | 172/9 |
| 4,549,610 | 10/1985 | van der Lely | 172/9 X |

FOREIGN PATENT DOCUMENTS

| | | | |
|---|---|---|---|
| 1920899 | 12/1970 | Fed. Rep. of Germany | 172/7 |
| 82/01354 | 4/1982 | PCT Int'l Appl. | 172/7 |
| 2105966 | 4/1983 | United Kingdom . | |

Primary Examiner—Richard T. Stouffer
Attorney, Agent, or Firm—Charles E. Brown; Charles A. Brown

[57] ABSTRACT

To avoid skidding of the driving wheels of a tractor (1) which runs on tires and which is fitted with hydraulic lifting devices (3, 4) on which are mounted working tools (35, 45) which are buried in the ground (in this case ploughs), the apparatus includes detector structure for determining the force for forward movement of the tractor, comparing that force to a reference value and producing pulses of less than one second, for alternately raising the two lifting devices (3, 4), the amplitude of the pulses being proportional to the excess of the forward movement force, up to a limit amplitude of centimeters approximately. The pulses are too short for the tools (35, 45) to lift with respect to the ground and the amplitude of the raising movement appears as squashing of the tires, which increases grip in order to overcome the excess of forward movement force.

8 Claims, No Drawings

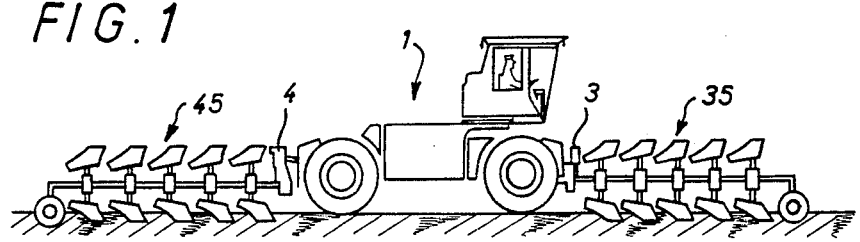
FIG.1
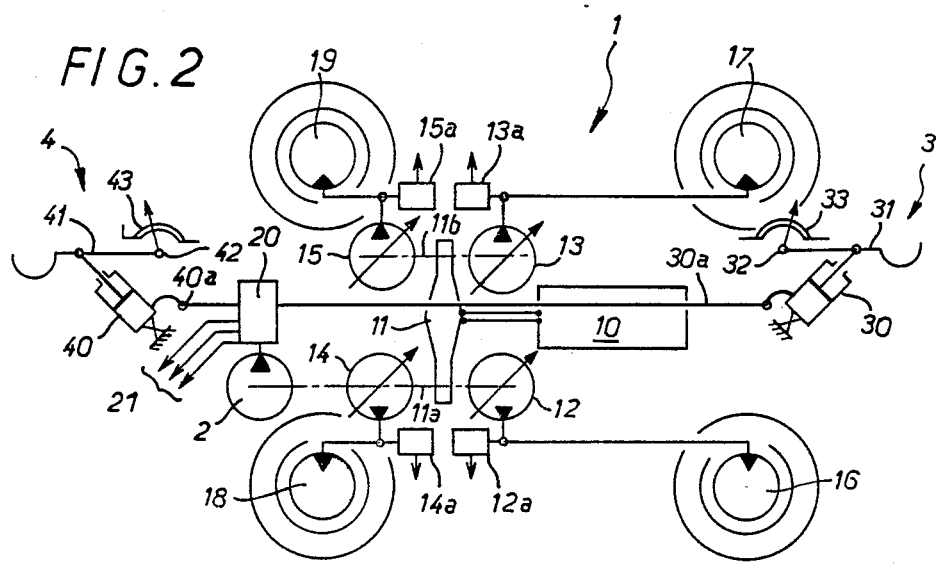
FIG.2
FIG.5
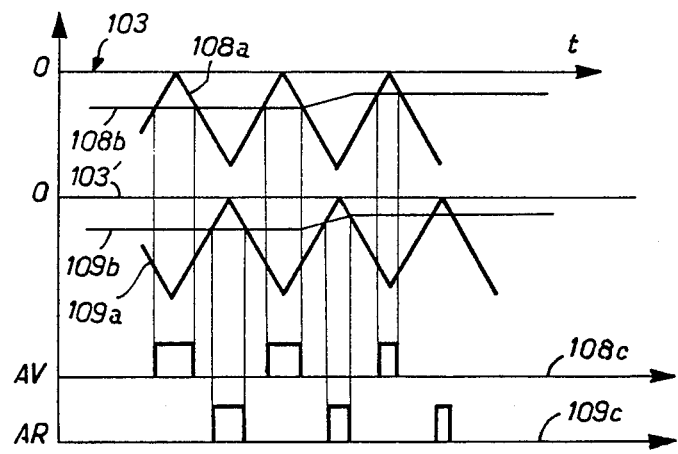

TRACTOR WITH HYDRAULIC CONTROL SYSTEM FOR PREVENTING SKIDDING

The invention relates to a process for preventing skidding of the drive wheels of a tractor on pneumatic tires and fitted with at least one hydraulic lifting device on which there is mounted an agricultural working tool buried in the ground, when the force for forward movement of the tractor is excessive. The invention relates to the tractor equipment for carrying out that process.

The search for increased agricultural productivity assumes inter alia that the areas of fields which are cultivated by a farmer are constantly increasing. That requires increases in tractor power in order to permit at the same time an increase in the speed of movement of the tractor and an increase in the operative forces for forward movement of the tractor, corresponding to the increase in the working width of the tools. The tools which put up the greatest resistance to forward movement are those which are intended to work the ground in respect of depth, plough shares, teeth of subsoil ploughs and stubble ploughs in particular. Those tools are arranged to stay at the desired working depth as a reaction to the resistance of the ground to the forward movement thereof. They can be generally denoted as being agricultural working tools which are buried in the ground.

It can be agreed that, all other things being equal, the resistance to forward movement is approximately proportional to the depth to which the tools are buried.

In order to achieve a good level of use of the tools, it is desirable for the force for forward movement of the tractor, which is a counterpart to the resistance to the forward movement of the tool, is controlled in such a way that it approaches the grip resultant of the driving wheels, while of course remaining lower than that level of grip. It will be clear that the degree of grip depends on the nature and the state of the ground, its consistency and its moisture content; it is also necessary to maintain a certain safety margin. It will also be recalled that the amount of grip may be increased by increasing the weight of the tractor, by using removable additional weighting members; however, ballasting of the tractor does not eliminate variations in grip which are due to the ground. Be that as it may, the irregularities in the resistance to forward movement of the tools which operate when buried in the ground are the major causes liable to cause skidding of the driving wheels, by virtue of the fact that they cannot be foreseen.

Conventionally, the tractor driver who finds or has a presentiment that his tool is digging in causes the tool to be raised in order to reduce the resistance to forward movement and to avoid skidding.

Tractors have been fitted with anti-skid devices which comprise, on the member coupling the tool to the tractor, a detector for detecting the traction force of the tool which is operating when buried in the ground. Lifting movement of the lifting device is controlled in dependence on the excess of the traction force with respect to a selected reference value in such a way that the tool is raised to a position in which its resistance to forward movement corresponds to the reference value. When subsequently the intrinsic resistance of the ground to forward movement of the tool is reduced, the tool can return to its normal working position, with the depth to which it is buried being regulated from the outset.

It will be appreciated that, if the work done by the tool is generally to be carried out at the set depth, automatically carrying the above-indicated procedure into effect requires the reference value in respect of the force for forward movement of the tractor to be regulated to a level sufficiently above the mean value of forward movement force in order for the tool to be raised only when the resistance to forward movement of the tool shows an abnormally high increase.

Now, as noted hereinbefore, the reference value is limited by the grip limit of the driving wheels, taking account of a safety margin. Thus, because of the effect of accumulative safety margins, it is necessary for the tools which operate in a buried condition in the ground to be so selected or regulated that the normal force for forward movement of the tractor is markedly lower than that which would be permitted by the level of grip of the driving wheels, which means that the working capacity of the tractor is underused.

Within the framework of the design of the present invention, it appeared desirable to overcome excesses of resistance to forward movement of the tool by a temporary increase in the capacity of the force for forward movement of the tractor, rather than avoiding such excesses of resistance to forward movement of the tool by a reduction in the working depth.

West German laying open document 1,920,899 discloses a connecting device between a tractor fitted with a three-point lifting arrangement, in dependence on a hydraulic pilot means, and a semi-carried plough provided with wheels for regulating the depth of ploughing. A hydraulic jack for producing a retraction movement if disposed between the upper arm of the lifting device and the front carriage of the plough, connected in parallel with the front lifting carriage.

The pilot means is responsive to the oil pressure in the coupling jack. In the event of the pressure exceeding a reference value, the pressure of the oil feeding the jacks is alternately cut off and restored. As a result, the rear wheels of the tractor are subjected to intermittent increases in load thereon and hammer on the ground in order to increase their grip. It will be noted that in parallel therewith the plough shares are oriented alternately in a downward movement mode and in a lifting movement mode. Moreover the hammering process is triggered off in response to an increased level of resistance of the part of the plough to forward movement thereof without direct reference to the force for forward movement of the tractor.

For that purpose, the invention proposes an apparatus for preventing skidding of the driving wheels of a tractor which runs on tires and which is fitted with at least one hydraulic lifting device on which there is mounted a working tool which is buried in the ground, when the traction force required by a tool becomes excessive, in which said force is measured and the lifting device is operated so as to reduce the depth to which the tool is buried in response to an excess of force with respect to a reference value, the lifting device being intermittently controlled for lifting movement of the tool of limited amplitude for the amplitude of the lifting movement to be distributed between the depth to which the tool is buried and a compression of the tires against the ground, characterised in that, the measured force corresponding to the sum of the couples transmitted to the driving wheels, the control for the lifting movement is effected by pulses of sufficiently short duration for the amplitude of the lifting movement to be exercised for a minor part in respect of the depth of burying of the tool and for a complementary major fraction in respect of compression of the tires against the ground.

It will be clear that, by virtue of the forces that the ground applies to the tool to hold it at the normal depth of burying thereof, the force urging the tool to life, by reaction, gives rise to an opposite force on the jacks of the lifting device which are anchored on the tractor. The flexibility of the tires permits the major part of the amplitude of the lifting movement to be absorbed by squashing of the tires, the tool remaining substantially anchored in the ground at the buried depth thereof during the duration of the pulse. It is known that most grounds afford markedly higher levels of resistance to forces of brief duration than to forces which act over a sustained period (creep). Compression of the tires against the ground has the effect of digging the tread pattern of the tires into the ground and thus producing a transient increase in the level of grip of the driving wheels. Thus the force for forward movement of the tractor is not reduced but the force capacity is increased.

It will be noted that in addition compression of the tires against the ground gives rise to deformation of the tire tread. The earth which is thus compacted between the tread pattern configurations is urged rearwardly of the part which is in contact with the ground. It is known that the earth which is compacted between the tread pattern configurations of the tire behaves like a part of the tire tread which appears smooth and liable to skid.

It will have been appreciated that, if the excess of the force for forward movement of the tractor is transitory, a pulse may be sufficient to overcome the instantaneous resistance. If however the excess of force for forward movement of the tractor persists, pulses will occur in succession without however the tool coming out of the ground.

Preferably, the amplitude of the pulse for lifting movement if an increasing function of the excess of force forward movement of the tractor, up to a fixed maximum amplitude. Thus, compression of the tires against the ground and the resulting increase in the level of grip adapt to the excess of the force for forward movement to be overcome. However the amplitude limit imposed takes account of the fact that, beyond a certain degree of squashing of the tires, deformation of the tires will eliminate the effectiveness of the compression effect of the tires against the ground, in regard to the level of grip, and is liable to cause damage to the tires.

In practice the lifting device is provided with a hydraulic control means which is dependent in respect of amplitude on a pilot signal. It is then sufficient for the pilot signal to be put into the form of a pulse of given amplitude for the lifting device to be operated by the apparatus as defined hereinbefore.

The apparatus can be applied to powerful tractors fitted with a plurality of lifting devices adapted to receive working tools which operate buried in the ground, in particular at the front and the rear of the tractor. In that case the lifting devices will be operated by pulses in cyclic succession. That makes it possible to operate the lifting devices from a single central pump, the cyclic succession further ensuring that each lifting device is operated independently of the others.

When the tractor has a hydraulic drive transmission with a pump unit driven by the heat engine, and one or a plurality of hydraulic motors each driving a drive axle of a driving wheel, the force for forward movement of the tractor is determined by measuring the fluid pressure at the intake of the hydraulic motor or motors. When there is a plurality of hydraulic motors, the force for forward movement is measured by the sum of the hydraulic fluid feed pressures of the motors.

In another aspect, the invention proposes an arrangement of hydraulic circuits of lifting devices of a tractor, which is intended to prevent skidding of the pneumatically tired driving wheels, a working tool which operates when buried in the ground being mounted on at least one hydraulic jack type lifting device, when the force for forward movement of the tractor becomes excessive, said arrangement comprising means for measuring the force for forward movement, which are adapted to provide a pilot signal when the measured force exceeds a reference value, and means for distribution of hydraulic fluid to the jacks of lifting devices which are responsive to the said pilot signal for distributing to the jack fluid under pressure in a direction which reduces the depth to which the tool is buried, characterised in that the control means are adapted to deliver to the jack, in response to the pilot signal, an amount of fluid under pressure which determines a transitory lifting movement of amplitude which is at most equal to a limit, in a length of time which is sufficiently short for the amplitude to be distributed between a reduction in the depth of burying of the tool in respect of a minor fraction, and compression of the tires against the ground for the complementary major fraction.

It will be appreciated that the above-indicated arrangement permits the above-defined invention to be carried into effect.

The features and advantages of the invention will be more clearly apparent from the following description by way of example with reference to the accompanying drawings in which:

FIG. 1 shows a tractor which is equipped in accordance with the invention,

FIG. 2 is a diagrammatic functional view of a tractor equipped according to the invention, FIG. 5 shows the control signals produced by the circuit of FIG. 4.

Figure 3:
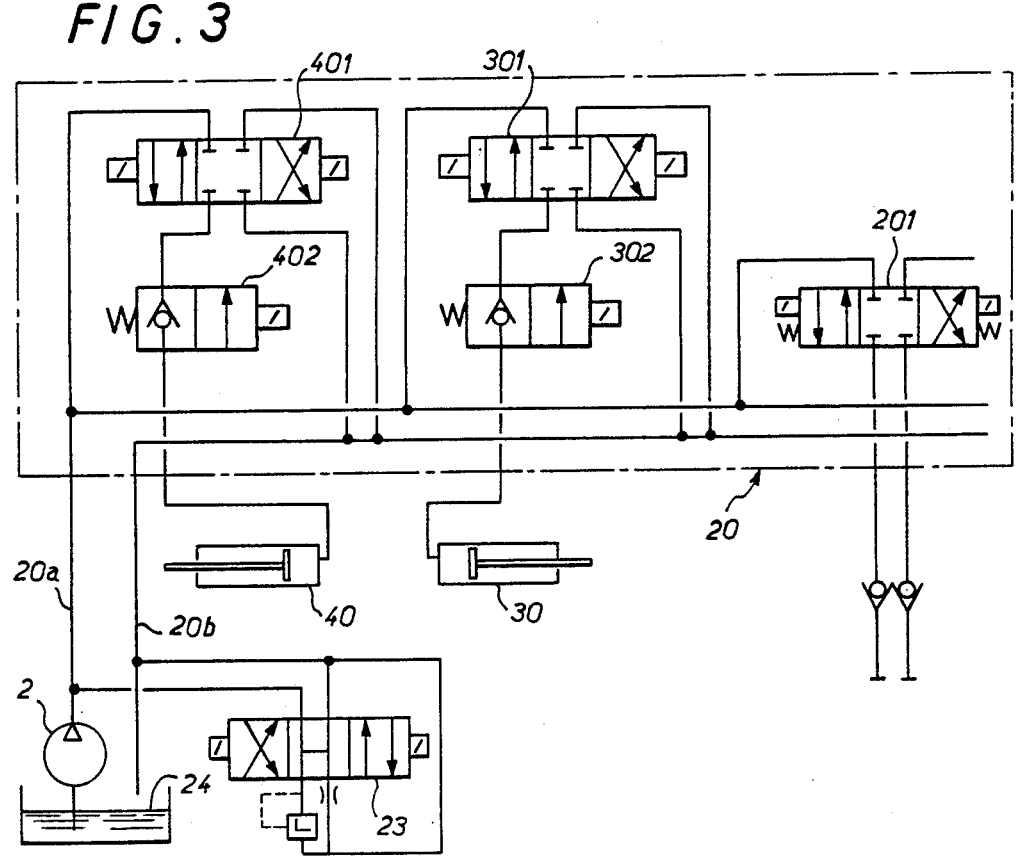
FIG. 3 is a diagram illustrating the hydraulic control of the lifting devices, in detail from FIG 2.

In accordance with the selected embodiment illustrated in FIGS. 1 and 2, a tractor 1 is generally fitted with two lifting devices, a front lifting device 3 and a rear lifting device 4, which are adapted to carry agricultural tools and in particular tools which operate when buried in the ground. FIG. 1 thus shows two ploughs 35 and 45 having five reversible blades.

As will be better seen from FIG. 2, the tractor comprises a heat engine 10 with at its output a distribution box 11 with two output shafts 11a and 11b. Coupled to the shaft 11a are two pumps 12 and 14 for hydraulic fluid, of adjustable capacity, which are respectively connected to two hydraulic motors 16 and 18 which respectively drive the right front wheel and the right rear wheel of the tractor 1. Also coupled to the shaft 11a is a hydraulic fluid pump 2 which serves the ancillary equipment and to which reference will be made again hereinafter. Coupled to the shaft 11b are two hydraulic pumps 13 and 15 of adjustable capacity, which are connected to hydraulic motors 17 and 19 respectively which respectively drive the front left and rear left wheels of the tractor 1. Electronic control means govern the output of the pumps 12 through 15 in known fashion to provide for forward movement of the tractor in such a way that the speed of rotation of each wheel is adjusted in co-ordinated manner with the others to compensate for the differences in the path covered by each wheel, in particular when following a curve, without one wheel being able to race away as a result of a loss of grip.

The tractor 4 thus has four driving wheels with a hydraulic transmission equivalent to a mechanical transmission with a gearbox and two locking-type axles. It will be added that the type of tractor 1 illustrated has power assisted steering which is effected by pivoting the chassis between the front and rear trains. It will be recalled that that arrangement is known per se.

The couple or torque delivered by each of the motors 16 through 19 is proportional to the hydraulic fluid pressure at the intake, each assembly consisting of the variable-capacity pump 12 through 15 and the motor 16 through 19 forming a volumetric transmission. Each conduit which connects a pump 12 through 15 to a motor 16 through 19 is provided with a proportional pressure detector 12a through 15a respectively which supplies a signal which is representative of the force for forward movement of the tractor, which is supplied to the tractor 1 by the respective wheel. It will be appreciated that the sum of the signals delivered by the detectors 12a through 15a is representative of the total force for forward movement of the tractor.

The hydraulic pump 2 which is allocated to serve the ancillary equipment feeds a distribution unit 20 which, as will be seen in greater detail with reference to FIG. 3, comprises distributors and valves controlled by an associated electronic assembly. Conduits 30a and 40a issue from the distribution unit 20 and serve the front and rear lifting jacks 30 and 40 respectively. The rods of the jacks 30 and 40 are connected to the lifting levers 31 and 41.

Position detectors are fixed on the shafts 32 and 42 for pivotally mounting the lifting levers 31 and 41 to the chassis, the position detectors being formed by potentiometers 33 and 34 whose sliders are entrained by the rotary movement of the levers 31 and 41 while the tracks are fixed with respect to the chassis. It will be appreciated that a reference voltage being applied to such tracks, the voltage between the end of the track and the slider varies with the angle of orientation of the associated lifting lever.

As will be seen from FIG. 3, the pump 2 is a pump of constant capacity which draws hydraulic fluid from a tank 24. Associated with the pump 2 is a pilot-controlled distributor 23 which provides for short-circuiting of the pump 2 when the distribution unit is inactive and is capable of replacing the short-circuit either by a restricted passage which causes the feed of the distribution unit 20 to be put under pressure or a closure or shut-off means, the distribution unit 20 then being fed in volumetric manner. That arrangement is known per se.

The distribution unit 20 is connected to the output of the pump 2 by the conduit 20a, the return of hydraulic fluid to the tank 24 being provided by way of the conduit 20b.

The feed of hydraulic fluid to the lifting jacks 30 and 40 is effected in respect of each thereof by way of a proportional distributor 301 and 401 respectively, and a pilot-controlled non-return valve 302 and 402 respectively.

The jacks 30 and 40 are single-acting jacks operating in the lifting mode. As the proportional distributors as at 301 and 401 generally have a slight leak in the central position between the two fluid circulation positions, such leakage would cause the lifting device to move slowly downwardly under the effect of the weight of the tools mounted thereon. The pilot-controlled non-return valves 302 and 402 permit the hydraulic fluid to pass freely towards the jack for the lifting movement of the lifting device but they prevent the return of fluid towards the tank unless they are pilot-controlled to an open position by a downward movement control signal.

The distribution unit 20 further comprises electrically operated distributors as at 201, which serve the ancillary equipment connections 21.

The electrical control means of the various distributors are co-ordinated by electronic circuits. The electronic circuits perform the following functions: on the one hand, individually, the proportional distributors are actuated in response to input signals coming either from manual control means or from suitable dependent control means; the mode of operation of the lifting control means will be specified in greater detail hereinafter; on the other hand, logic connections can inhibit the operation of certain distributors when others are operating. Thus the distributors of ancillary equipment 201 have priority over the lifting distributors when the latter are being operated in the lifting mode; the front lifting distributor 301 has priority over the rear lifting distributor. Such priority relationships are necessary by virtue of the use of a single pump for all the ancillary equipment but the attribution of priority to certain functions is a matter of suitability. Thus, at the end of a field, the front tool must be lifted before the rear tool.

Control of the lifting devices constitutes a pilot-controlled system. The driver of the tractor has at his disposal a lifting position control which is a manually operated potentiometer. The voltage at the slider of the control potentiometer is compared to the voltage at the slider of the potentiometer 33 or 34, depending on the lifting device being considered. The difference is amplified; the amplifier is saturated for a difference to 10 corresponding centimeters in height as determined at the hooks of the lifting device.

The amplified voltage is subjected to discrimination according to its polarity, that is to say depending on the direction in which the lifting device is to be operated. In addition, depending on the respective situation, the proportional distributors 301 and 401 are operated in the appropriate direction proportionally to the voltage difference, so that the flow of hydraulic fluid, that is to say the speed of operation of the jack 30 or 40 respectively, is proportional to the difference, so that the controlled operations of the lifting devices are quick but without bumps or jerks. The valves 302 or 402 are open if the control is set to the downward movement mode. In addition the distributor 23 is operated in such a way that, for a lifting movement, there is no by-pass flow of fluid through the distributor 23 while for a downward movement the by-pass flow of fluid through the distributor 23 is constricted to control the downward movement.

It will be noted that the arrangement whereby the speed of operation of the jack is proportional to the difference between the voltages which are representative of the assigned position and the actual position of the lifting lever, although permitting rapid reaction of the lifting movement without jerks when the manual control means is used to produce a lifting movement, makes the lifting device capable of operating movements of pulsed type, if a voltage pulse is superimposed on the difference between the representative voltages. In that case actuation of the jack begins at the maximum speed after a brief acceleration phase due to the time constants of the electro-hydraulic circuits.

It is that type of operation which will be used to advantage in the process of the invention when the force for forward movement of the tractor exceeds a reference value.

Figure 4:
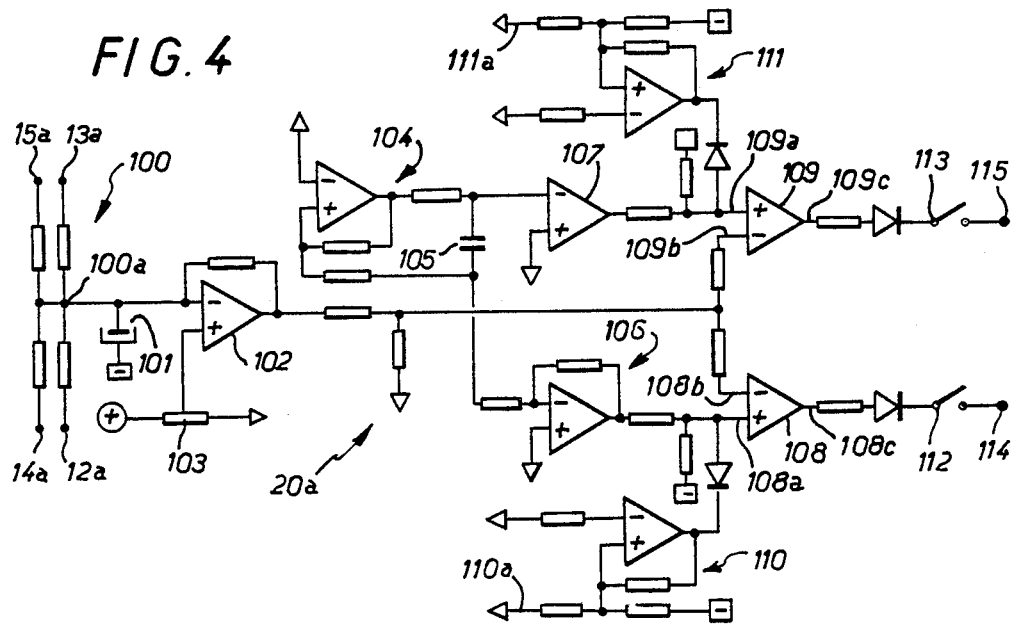
FIG. 4 is a diagrammatic view of the electrical control of the process according to the invention.

The circuit 20a, the layout of which is shown in FIG. 4, is intended to produce a pilot control signal for carrying out the procedure according to the invention.

The outputs of the proportional pressure detectors 12a, 13a, 14a, 15a (FIG. 2) are applied to a summing means 100 formed by a star configuration of four resistors. The junction 100a of the summing means is connected to the inverting input of a feedback-regulated gain amplifier 102. A capacitor 101 smooths the sum voltage. The direct input of the amplifier 102 is connected to the slider of a potentiometer 103 which defines a reference voltage representative of a selected force for forward movement of the tractor.

The amplifier 104 and 107 which are connected in capacitive feedback mode by the capacitor 105 form a relaxation oscillator producing a triangular output voltage. That output voltage is applied to the direct input of an output amplifier 109. It is also applied to the inverting input of an amplifier 106 which is adjusted to unit gain by feedback. The output of the amplifier 106 is applied to the direct input of an output amplifier 108. It will be appreciated that the amplifier stages 108 and 109 thus receive in phase opposition the periodic triangular voltage produced by the oscillator 104, 105, 107. Moreover the output amplifiers receive in parallel at their inverting inputs the voltage from the amplifier 102. The amplifiers 108 and 109 are disposed without gain limitation so as to deliver an output signal in two states, depending on the direction of the difference of the voltages applied.

In addition the direct inputs of the amplifiers 108 and 109 are connected by way of diodes to the outputs of amplifiers at 110 and 111 respectively, which are arranged as Schmidt triggers, and which at their inputs 110a and 111a respectively receive the voltages produced by the position detector potentiometers 33 and 43 (see FIG. 2) respectively. The arrangement is such that, when the corresponding lifting lever is in the raised position, the amplifier 110 or 111 switches and blocks the output amplifier 108 or 109, nullifying the triangular signal.

The signals produced by the circuit in FIG. 4 are shown in FIG. 5. The triangular signals which are applied in phase opposition relationship to the direct inputs of the amplifiers 108 and 109 are represented by the broken lines 108a and 109a respectively. The voltage which is representative of the reference force defines the straight lines 103 and 103' and the lines 108b and 109b correspond to the force for forward movement of the tractor. The maxima of the lines 103a and 109a are located on the straight lines 103 and 103', the differential amplifier 102 (see FIG. 4) producing a difference signal on an initial voltage.

When the voltages at 108a and 109a are lower than the voltage applied to the inputs 108b and 109b of the amplifiers 108 and 109, the latter are blocked at 108c and 109c ; when the voltages at 108a and 109a are higher than the voltages at 108b and 109b, the amplifiers 108 and 109 are saturated at the outputs 108c and 109c. As can be seen from FIG. 5, the outputs 108c and 109c supply pulses whose width is proportional to the difference in voltage between 103, 103' and 108b, 109b, that is to say the excess of the force for forward movement as measured, over the reference value in respect of that force, the force for forward movement of the tractor being measured by the sum of the output signals of the proportional pressure detectors 12a through 15a (see FIG. 2).

It will be recalled that the voltages 108a and 108b are triangular, symmetrical and opposite so that the pulses 108c and 109c occur in alternate succession. The parameters of the oscillator 104, 107 and 105 are so determined that the frequency of the triangular signals is 0.7 Hz approximately, whereby the period of the pulses 108c and 109c is about 1.4 s, and the succession period is 0.7 s. It will be noted that the amplifier 102 acts on the voltage amplifiers 108 and 109 by way of an attentuating network. When the amplifier 102 is saturated, the voltage 108b, 109b is a little lower that the peak-to-peak voltage of the signals 108a, 109a so that the pulses 108c and 109c do not overlap. The gain of the amplifier is adjusted for saturation to correspond to 40 kN (that is to say 4 tonnes in current language usage).

Switches 112 and 113 which can be operated by the driver of the tractor make it possible for the signals 108c and 109c to be applied to the respective inputs 114 and 115 of other electronic pilot control circuit of the hydraulic circuits shown in FIG. 3, 114 corresponding to the arrangement including the proportional distributor 301 and the pilot-controlled valve 302 and 115 corresponding to the proportional distributor 401 and the valve 402.

It was noted in the passages referring to the mode of operation of the hydraulic circuits that the speed of operation of the lifting jacks was proportional to the difference between the voltages which are representative of the assigned position and the actual position of the lifting levers and that the superimposition of voltage pulses on the difference voltage caused actions of pulsed type on the jacks.

It will be stated that the pulses supplied to the inputs 114 and 115 are of constant amplitude and a duration which varies with the excess of the force for forward movement of the tractor. The lifting jacks 30 and 40 will thus be operated at maximum speed for a variable period of time which however is limited to a little less than 0.7 s. A lifting movement amplitude of 10 centimeters at the lifting hook corresponds to the maximum duration of the pulse, by virtue of the various adjustments involved. At the end of the pulse, the return to the assigned position by discharge of the hydraulic liquid into the tank 24 (see FIG. 3) occurs under comparable conditions in respect of speed.

When the tractor is fitted with two tools which operate when buried in the ground, for example two multi-blade ploughs 35 and 45 which operate with one being pushed and the other being pulled, the driver operates the switches 112 and 113 (see FIG. 4) and sets the potentiometer 103 for a reference value in respect of the traction force. The reference traction force corresponds, with a safety margin, to good utilisation of the capacities of the tractor in respect of power and grip, and efficient working of the tools. The reference force is determined on the basis of the experience of the driver of the tractor, in consideration of the characteristics of the tools and the tractor.

In normal operating forward movement, the traction force which is close to the reference value is lower than same. If as a consequence of a change in the consistency of the ground being worked, or due to the presence of obstacles in the ground (stones and roots), the force for forward movement of the tractor exceeds the reference force, the procedure as described above with reference to FIGS. 4 and 5 in essence is set in operation. As has been noted hereinbefore, the lifting jacks 30 and 40 are operated alternately in a pulsed mode in the direction of lifting movement, with an amplitude which increases with the excess of the force for forward movement.

Those pulses are relatively short. The rheological properties of the grounds and the form of the tools 34 and 45 which work when buried in the ground are such that generally speaking lifting of the tools requires a vertical force which increases with the lifting speed. That means that the short lifting-movement pulses at a high rate generate only lifting movements of small amplitude of the tool which is engaged by the lifting devices, in relation to the ground in which that tool is buried. The amplitude of the lifting movement as measured by means of the potentiometers 33 and 43 with respect to the chassis of the tractor is distributed as between the lifting movement of the tool 35, 45 in respect of a minor part, and the compression of the tractor against the ground, in respect of a major part. That compression of the tractor against the ground essentially results in the pneumatic tires being squashed; the squashing action affects mainly the front or rear tires depending on whether the operated lifting device is the front or rear lifting device since the buried tool which produces the counteracting anchoring effect is in front of the front tires or behind the rear tires, depending on which lifting jack is actuated.

Squashing of the tires under the effect of compression of the tractor against the ground produces two advantageous effects. The contact surface area between the tire and the ground is increased and at the same time the contact pressure is slightly increased. The limit grip of the tire is increased in proportion to the vertical force acting on the wheel to compress it against the ground, which makes it possible to respond to an increase in the level of resistance to forward movement of the tool by an increased force for forward movement of the tractor. In addition, deformation of the tires when being squashed in that way results in relative movements of the tread pattern configurations of the tread, followed by those tread pattern configurations returning to their original relative position. Such transitory shifts in the tread pattern promote detachment and ejection of the fragments of earth which are packed between the configurations of the tread pattern and the accumulation of which is equivalent to making the tread pattern completely smooth, thus facilitating skidding of the wheels. That phenomenon of cleaning out the tread pattern is made effective by virtue of the unusual amplitude of the squashing movements of the tires, and the short duration of deformation thereof.

It has been appreciated that, when the resistance to forward movement of the tools in the ground has returned to normal, being therefore lower than the reference value, the pulses for lifting movement stop. It will be noted however that, unlike the conventional anti-skid procedures which adjust the depth of working of the tool in order to regularise the force for forward movement of the tractor, the anti-skid process does not give rise to substantial variations in the depth of working of the tool. The increase in the level of resistance is overcome by an increase in force, which is made possible by an accompanying increase in the amount of grip. It will be appreciated that that assumes that the tractor is capable of producing the necessary power.

It will be clear that the arrangement described may use just one tool which operates when buried in the ground, the control for the lifting device which is not carrying that tool being neutralised by opening the corresponding switch 112 or 113. It would be at least useless if not troublesome to lift a tool which is not anchored in the ground.

It will be appreciated that the invention is not limited to the embodiment described but covers all the alternative forms thereof. Thus the invention can be applied to a tractor which has only two driving wheels or a single lifting device capable of being fitted with a tool which operates when buried in the ground. The tractor could be of the type having a purely mechanical transmission, or a hybrid mechanical and hydrostatic transmission, even if a hydrostatic transmission makes it particularly easy to determine the force for forward movement of the tractor.

We claim:

1. In a tractor of the type having a heat engine, wheels with pneumatic tires and a working tool mounted on lifting means and adapted to operate normally at a predetermined depth in the ground, a hydraulic control system for preventing skidding when required traction force or forward thrust exceeds a predetermined limit, said hydraulic control system comprising at least one hydraulic motor connected to a drive axle for one of the wheels, a pump adapted to be coupled to the heat engine for supplying pressurized hydraulic fluid to said at least one hydraulic motor, hydraulic actuating means for actuating at least one said lifting means, measuring means for measuring forward thrust of the tractor and providing a pilot control signal when the forward thrust exceeds a predetermined limit, said measuring means including a proportional pressure detector connected to an intake side of said at least one hydraulic motor, means for distributing hydraulic fluid to said actuating means responsive to the pilot control signal so as to reduce transitorily the operating depth of the working tool by an amount no greater than a present maximum for a sufficiently short time period for the amount to be divided between raising the working tool and compressing the tires, the portion of the amount corresponding to the compression of the tires being substantially greater than that corresponding to the raising of the working tool.

2. A control system according to claim 1, wherein said measuring means comprises detector means for detecting the forward thrust and providing a force signal which is substantially proportional to the forward thrust, a comparator means adapted to receive the force signal and a reference signal and produce the pilot control signal which is substantially proportional to the amount the force signal exceeds the reference signal up to a maximum and constant therebeyond.

3. A control system according to claim 2, wherein servo control means controls said means for distributing the hydraulic fluid to said actuating means and detectors for detecting the position of the lifting means, the pilot control signal being applied to said servo control means.

4. A control system according to claim 3, wherein the tractor has a hydraulic drive transmission with a pump unit connected to the heat engine, said at least one hydraulic motor connected to the drive axle being arranged to be supplied with hydraulic fluid from said pump unit, and a proportional pressure detector connected to the intake side of said at least one hydraulic motor for producing the force signal.

5. A control system according to claim 4, a plurality of said hydraulic motors, each proportional pressure detector for each of said hydraulic motors and a summing means receiving an output signal from each of said detectors to produce a weighted force signal.

6. A control system according to claim 1, wherein servo control means controls said means for distributing the hydraulic fluid to said actuating means and detectors for detecting the position of the lifting means, the pilot control signal being applied to said servo control means.

7. A control system according to claim 1, wherein the lifting means comprises plural lifting devices each having a corresponding hydraulic jack, and said means for distributing hydraulic fluid to said actuating means being connected to each of said lifting devices for providing cyclic pulsed lifting movement.

8. A control system according to claim 7, wherein said means for distributing hydraulic fluid to said actuating means is adapted to inhibit selectively the pilot control signal for each of said lifting devices when in a raised position.

* * * * *